UNITED STATES PATENT OFFICE.

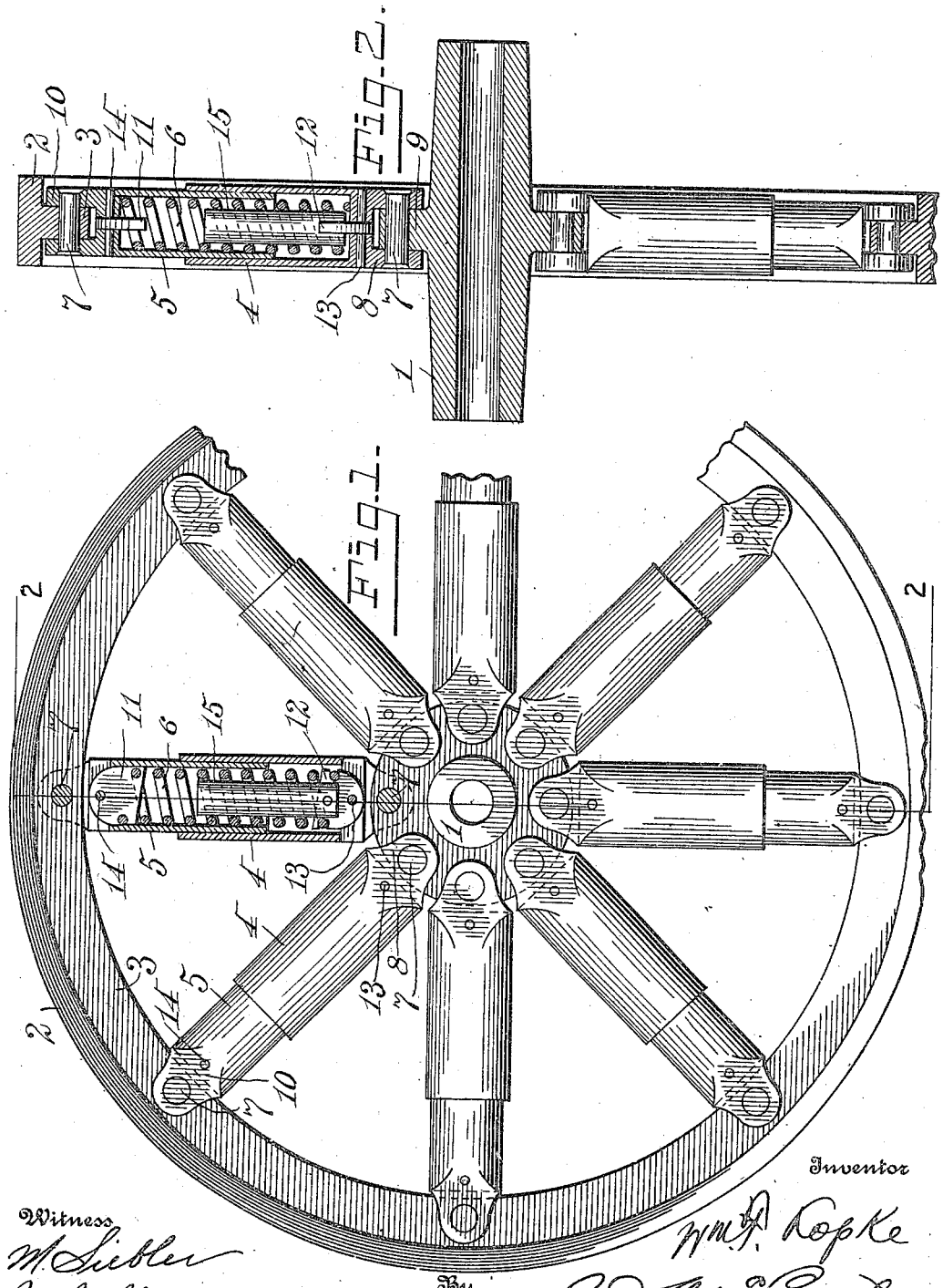

WILLIAM F. KOPKE, OF DAYTON, OHIO.

RESILIENT WHEEL.

1,269,286.     Specification of Letters Patent.     Patented June 11, 1918.

Application filed October 25, 1916. Serial No. 127,515.

*To all whom it may concern:*

Be it known that I, WILLIAM F. KOPKE, a citizen of the United States, residing at Dayton, in the county of Montgomery and State of Ohio, have invented certain new and useful Improvements in Resilient Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in resilient wheels. The improvements relate to the resilient wheels shown and described in my former Patent, No. 1,114,891, of October 27, 1914, and consists in the production of a wheel of such type which has greater resiliency than heretofore and is more responsive. In a detail description of my invention, reference is made to the accompanying drawings of which Figure 1 is a side elevation of my improved wheel, partly in section and part broken away; and Fig. 2 is a sectional view on the line 2—2 of Fig. 1.

In the description and drawings, similar reference characters indicate corresponding parts.

Referring more particularly to the drawings, 1 designates the hub and 2 the rim of the wheel, the latter portion having a central inwardly projecting flange 3. The spokes consist each of two telescoping tubular parts 4 and 5 which inclose a coil spring 6. The outer tubular member 4 of each spoke is fixed to the hub by a pin 7, said member 4 having a bifurcated base 8 which straddles the flange 9 of the hub. The inner tubular member 5 is in a similar manner provided with a bifurcated end 10 which straddles the flange 3 and is thus fixed to the wheel rim by a pin 7. The spring 6 within each spoke so constructed of the telescoping tubes 4 and 5 is connected at its ends to plates 11 and 12 which are pivoted to the ends of said tubes 4 and 5, by pins 13 and 14. As shown in the drawings, the said springs when under normal expansion, as when they are assembled in the spokes, occupy substantially the length of said spokes. The springs being of this character they afford a maximum of elasticity and in their action said springs are subject alternately to a maximum degree of compression and expansion, thus equalizing the strain to which they are subjected throughout the wheel. A guide or support is provided for each spring consisting of a core 15 which fits in each spring loosely at the end nearest the hub. Each spring so connected up and supported is subjected to compression and expansion according to the positions of the spokes as the wheel turns and as a whole the wheel has a maximum of elasticity in action.

Having described my invention, I claim.

In a wheel of the character specified, the combination with the rim and the hub thereof, of hollow spokes consisting each of two telescopic members which are attached respectively at their outer and inner ends to the rim and hub of the wheel respectively, a coil spring in each of said telescopic spokes occupying substantially the length of said spokes when they are under normal expansion, members attached to the inner and outer ends of said spokes and to which the ends of said springs are attached, and a guide member for each spring lying within the coils thereof, said guide members being attached to the members to which the inner ends of the springs are attached, whereby the said springs are subjected alternately to a maximum amount of compression and expansion during the rotation of the wheel.

In testimony whereof I affix my signature, in presence of two witnesses.

WILLIAM F. KOPKE.

Witnesses:
   MELLIE GALLOWAY,
   MATTHEW SIEBLER.

Copies of this patent may be obtained for five cents each, by addressing the "Commissioner of Patents, Washington, D. C."